UNITED STATES PATENT OFFICE.

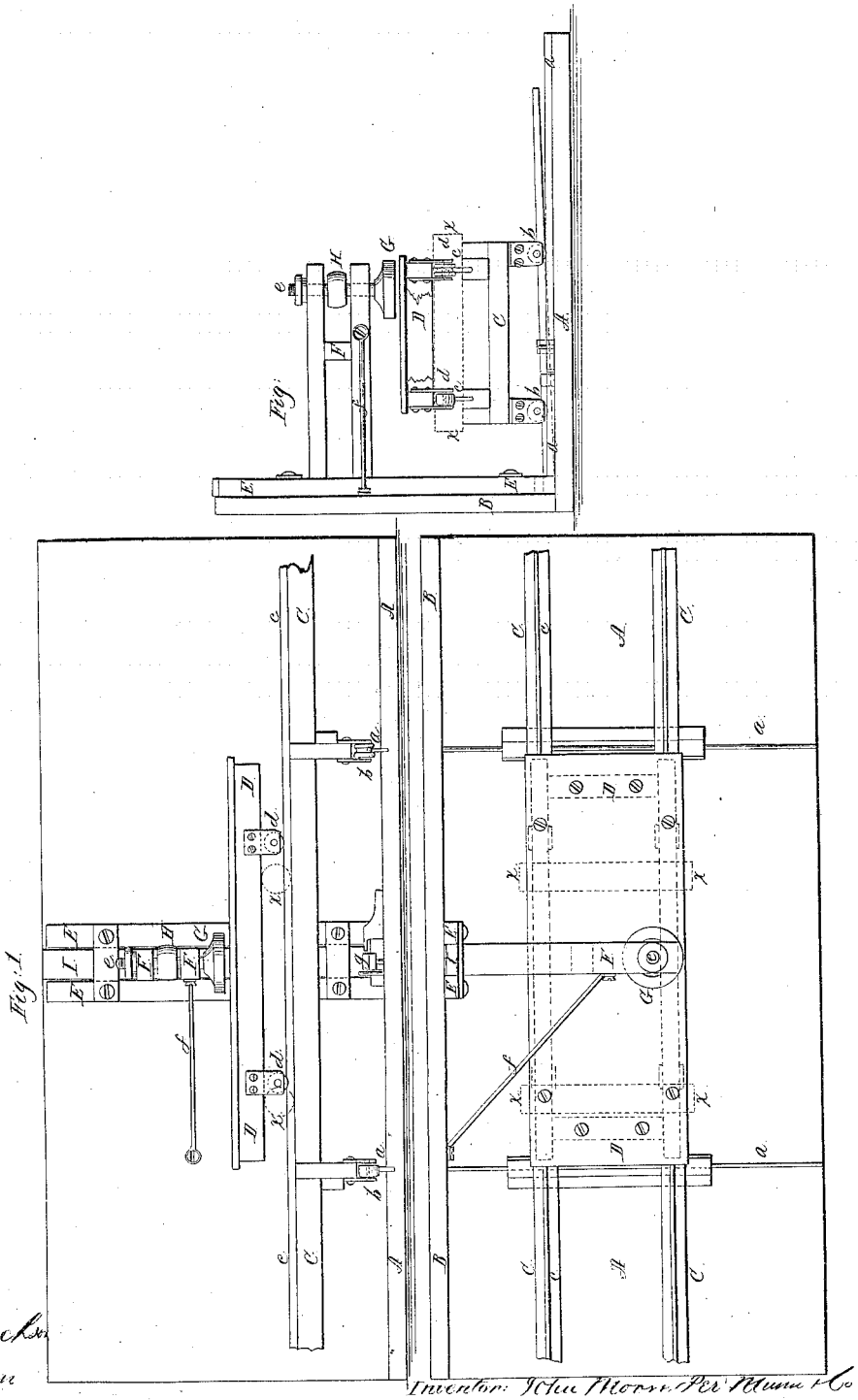

JOHN MOORE, OF GARDINER, MAINE.

IMPROVEMENT IN MACHINES FOR POLISHING WOOD.

Specification forming part of Letters Patent No. 59,625, dated November 13, 1866.

*To all whom it may concern:*

Be it known that I, JOHN MOORE, of Gardiner, in the county of Kennebec and State of Maine, have invented a new and Improved Polishing-Machine; and I do hereby declare that the following is a full, clear, and exact description thereof, which will enable others skilled in the art to make and use the same, reference being had to the accompanying drawings, forming part of this specification, in which—

Figure 1 is a side elevation of the machine. Fig. 2 is a plan. Fig. 3 is an end view.

Similar letters of reference indicate like parts.

This invention relates to an improved polishing-machine for smoothing the faces or flat sides of doors; and consists in a combination of a carriage for supporting a table on which the door is to be laid flat for polishing with rails and rollers for moving the table longitudinally and transversely under a revolving rubber or polisher, so that every part of the face of a door may be brought under the polisher and be made smooth.

This invention is intended for the same purpose as my improved polishing-machine for which Letters Patent were granted July 22, 1856, No. 15,382, from which, however, it differs entirely in arrangement, reducing materially the cost of construction.

Upon a suitable flooring or foundation, A A, are laid two rails, *a a*, transversely, and running back to a vertical siding or wall, B B. Mounted on rollers or wheels *b b*, which travel on the rails *a a*, is a truck-carriage, C C, on the top of which are laid two rails, *c c*, lengthwise and at right angles to the rails *a a*. A table, D D, is mounted on rollers or wheels *d d*, which travel on the rails *c c*; or the arrangement may be modified by placing the rails on the under side of the table and the wheels or rollers on the upper side of the carriage C, to produce the same longitudinal movement of the carriage. On the wall B is fastened a vertical slide-frame, E E, between the rails *a a* in which frame works a sliding framed arm, F, which projects horizontally at right angles over the table D, and on the outer end of which a polishing-rubber, G, is hung on a vertical spindle, *e*, to be rotated by a pulley, H, by any suitable motor. A brace, *f*, connects the arm F with the wall B. The arm F slides up and down in the slide-frame E sufficiently only for raising the rubber G from the surface of the door, or to allow it to be placed upon the table D for polishing, by means of a treadle-lever, *g*, near the floor, the inner end of which works the slide I of the arm F up and down as required. The rubber G is adjusted in position for doors of different thickness by a wedge or glut, *h*, Fig. 2, on the inner end of the treadle-lever *g*.

It will be seen that when a door is laid horizontally on the table D, and the rubber G is brought down upon its surface, the door may be moved under the rubber, so that all parts may be smoothed or polished alike by the longitudinal motion of the table and the transverse motion of the carriage C while the rubber revolves.

The table D and the wheels *d d* and the rails *c c* may be dispensed with, if desired, and the door to be polished may then be laid flat on long rollers *x*, laid crosswise, as shown in red at *x*, on the carriage, and the door may be moved upon the rollers longitudinally under the polishing-rubber, instead of being placed upon the moving table, the said rollers thus constituting an equivalent device to the moving table, and facilitating the longitudinal movement of the door similar to the movement thereof when placed upon the table.

Having described my invention, what I claim as new, and desire to secure by Letters Patent, is—

The combination and arrangement of the carriage C, mounted on the wheels *b b* upon the transverse rails *a a*, with the table D, mounted on the wheels *d d* upon the longitudinal rails *c c*, or its reversed equivalent arrangement, when used in connection with a revolving rubber, G, supported by a sliding arm, F, for polishing doors, constructed and operating substantially as herein described.

JOHN MOORE.

Witnesses:
DANL. NUTTING,
JNO. B. NUTTING.